US009003448B2

(12) United States Patent
Roberts et al.

(10) Patent No.: US 9,003,448 B2
(45) Date of Patent: Apr. 7, 2015

(54) USER-BASED PROGRAM GUIDE METHODS AND SYSTEMS

(75) Inventors: Brian F. Roberts, Dallas, TX (US); Donald H. Relyea, Dallas, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 485 days.

(21) Appl. No.: 12/981,901

(22) Filed: Dec. 30, 2010

(65) Prior Publication Data

US 2012/0174162 A1 Jul. 5, 2012

(51) Int. Cl.
*G06F 3/00* (2006.01)
*G06F 13/00* (2006.01)
*H04N 5/445* (2011.01)
*H04N 21/45* (2011.01)
*H04N 21/4788* (2011.01)
*H04N 21/482* (2011.01)

(52) U.S. Cl.
CPC ....... *H04N 5/44543* (2013.01); *H04N 21/4532* (2013.01); *H04N 21/4788* (2013.01); *H04N 21/4821* (2013.01); *H04N 2005/44556* (2013.01)

(58) Field of Classification Search
USPC ...................................... 725/46–52
See application file for complete search history.

(56) References Cited

U.S. PATENT DOCUMENTS

| 5,758,259 | A  | * | 5/1998  | Lawler       | 725/45  |
| 6,486,920 | B2 | * | 11/2002 | Arai et al.  | 348/563 |
| 2003/0037144 | A1 | * | 2/2003 | Pestoni et al. | 709/226 |
| 2008/0147650 | A1 | * | 6/2008 | Marsh        | 707/5   |

* cited by examiner

*Primary Examiner* — Pankaj Kumar
*Assistant Examiner* — Charles N Hicks

(57) ABSTRACT

An exemplary method includes a media content delivery system 1) providing a program guide view of a program guide for display within a viewing area of a display screen, the program guide comprising a navigable user axis representative of a plurality of users selected by a main user as being of interest to the main user and a time axis representative of a plurality of time slots, and 2) presenting, within the program guide view, information identifying one or more media content instances designated for access during one or more time slots included in the plurality of time slots by one or more users included in the plurality of users. Corresponding methods and systems are also disclosed.

17 Claims, 13 Drawing Sheets

USER-BASED PROGRAM GUIDE METHODS AND SYSTEMS

BACKGROUND INFORMATION

Set-top box devices have provided users of such devices with access to a large number and variety of media content programs and services. For example, a user may choose to experience a variety of broadcast television programs, pay-per-view services, video-on-demand programming, and audio programming via a set-top box device.

The large number of media content choices offered by providers can make it difficult for a user of a set-top box device to find and select desired media content. On-screen program guides have alleviated this problem to some degree.

However, as providers have expanded and continue to expand the services and media content choices provided to users (e.g., more media channels), conventional tools for navigating within program guides have become inefficient and less effective. For example, it is a time-consuming task to scroll through a conventional program guide having hundreds of channels in search of a particular media channel or program. Moreover, it is often difficult for a user to locate programming within a program guide that is potentially of interest to the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for providing a user-based program guide are described herein. The program guide may include information identifying one or more users who have accessed or who will access one or more media content instances listed within the program guide.

For example, the program guide may include a navigable user axis representative of a plurality of users selected by a main user as being of interest to the main user and a time axis representative of a plurality of time slots. A media content delivery system may present information within the program guide identifying one or more media content instances designated for access during one or more time slots included in the plurality of time slots by one or more users included in the plurality of users. The main user may navigate along the user axis to view information identifying media content instances that the users have accessed (e.g., watched or recorded), are currently accessing, and/or will access in the future. This and other exemplary program guides will be described in more detail below.

The methods and systems described herein may allow a user to easily ascertain which media content instances his or her friends and/or other users of interest are accessing (e.g., watching and/or recording) at any given time. In this manner, the user may readily discover media content that may be of interest to the user, track viewing habits of one or more other users, and/or engage in a more socially interactive media content viewing experience.

As used herein, "media content" may refer generally to any content made accessible by a media content provider system to a media content access device (e.g., a set-top box device). The terms "media content instance" and "media content program" as used herein may refer generally to any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user.

Figure 1:
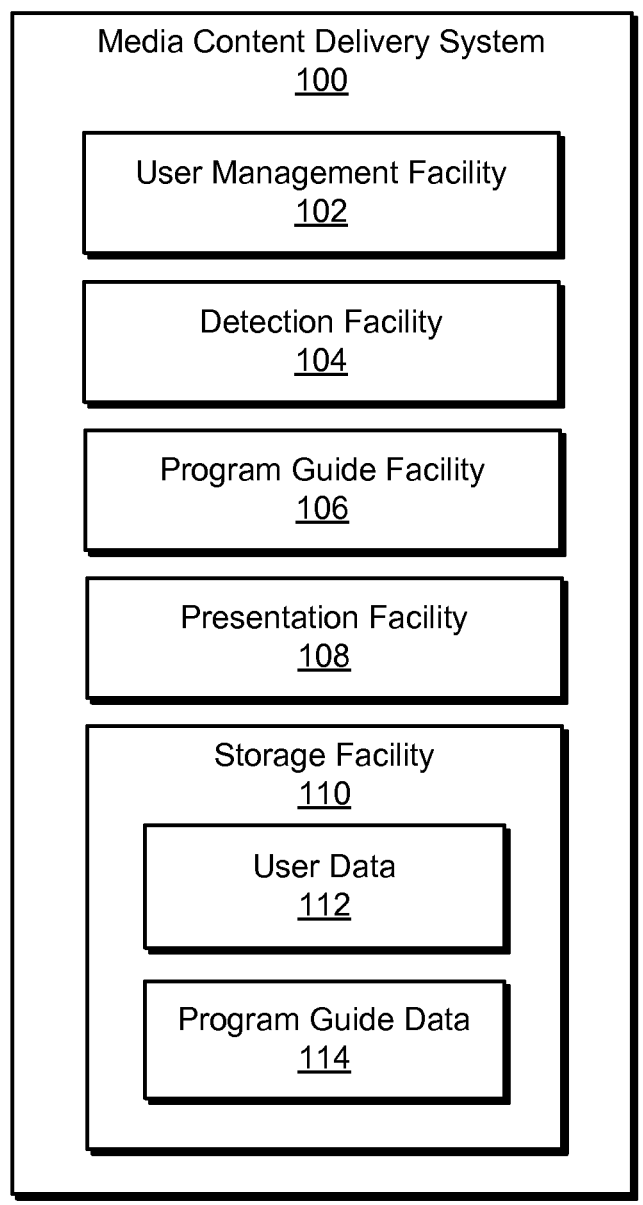
FIG. 1 illustrates an exemplary media content delivery system according to principles described herein.

FIG. 1 illustrates an exemplary media content delivery system 100 (or simply "system 100"). As will be described in more detail below, system 100 may be configured to provide a program guide that includes information identifying one or more users who have accessed or who will access one or more media content instances listed within the program guide. System 100 may include, but is not limited to, a user management facility 102, a detection facility 104, a program guide facility 106, a presentation facility 108, and a storage facility 110, which may be in communication with one another using any suitable communication technologies. Each of these facilities will now be described.

User management facility 102 may be configured to facilitate selection by a main user of one or more other users as being of interest to the main user. As used herein, a user who is "of interest" to a main user refers to a user whose media content access actions (e.g., viewing history, recording selections, etc.) are of interest to the main user.

In some examples, user management facility 102 may provide one or more user management graphical user interfaces ("GUIs") with which the main user may interact. For example, the main user may utilize a user management GUI to select a group of users as being "friends" of the main user and/or otherwise select users in whom the main user is interested. The main user may further utilize the user management GUI to remove one or more users from the group of users in whom the main user is interested and/or set one or more personal access preferences (e.g., whether the user desires to expose his or her own media content actions).

Detection facility 104 may be configured to detect a designation of access to one or more media content instances by one or more users selected by a main user as being of interest to the main user. As used herein, a "designation of access" to one or more media content instances by one or more users refers to one or more instructions provided by the one or more users to access the one or more media content instances by way of one or more media content access devices. For example, a user may provide one or more instructions to a media content access device for the media content access device to present, record, and/or otherwise access a media content instance. Hence, a designating of access by a user to a media content instance may indicate that the user has watched and/or recorded the media content instance, is currently watching and/or recording the media content instance, and/or will watch and/or record the media content instance.

Detection facility 104 may detect a designation of access to a media content instance by a user in any suitable manner as may serve a particular implementation. For example, detection facility 104 may detect one or more instructions provided by the user to tune to a particular channel carrying the media content instance, record the media content instance, purchase access to the media content instance, and/or otherwise access the media content instance. In some example, a media content access device may generate and/or update an extensible markup language ("XML") file with data representative of a detected designation of access to a media content instance. The XML file may be transmitted or otherwise provided to detection facility 104, which may analyze the data to determine that the designation of access has been performed.

In some examples, detection facility 104 may log detected designation of access events performed by the one or more users over a period of time. In this manner, an access history of the one or more users may be provided to the main user upon request.

In some examples, the media content instances that may be designated for access by the one or more users may include media content instances available by way of a service provider network (e.g., a subscriber television service provider network). In this manner, any user with a sufficient level of access to the service provider network may access the media content instances. To facilitate access to the media content instances, as will be described below, information identifying the media content instances may be included in a program guide associated with the service provider network.

Program guide facility 106 may be configured to provide a program guide for display by a display device associated with the main user. The program guide may include information identifying media content instances available for access by way of a media content access device. For example, the program guide may include information identifying media content instances broadcast or otherwise transmitted in accordance with a media content transmission schedule by way of a network associated with a service provider.

In some examples, the program guide provided by program guide facility 106 includes a matrix of cells. Each cell may be associated with a particular media content instance. For example, each cell may identify (e.g., display a name of and/or other information about) a particular media content instance.

As will be described below, the matrix of cells included in the program guide may be arranged relative to a plurality of axes. One of the axes may include a navigable user axis that includes a plurality of positions each associated with a particular user included within a plurality of users (e.g., a plurality of users designated as being of interest to the main user) and a particular set of one or more cells within the matrix of cells. Accordingly, as will be described in more detail below, the main user may navigate within the program guide "by user" (i.e., by scrolling along the user axis) to see which media content instances his or her friends or other users of interest have designated for access. The program guide may additionally include one or more time axes representative of a plurality of time slots and/or one or more channel axes representative of a plurality of channels, as will be described below.

It will be recognized that, in most instances, only a portion of a program guide may be displayed within a display screen at any given time. As used herein, the term "program guide view" will be used to refer to the portion of the program guide provided by program guide facility 106 that is displayed within a display screen at any given time. A program guide view may include a graphical arrangement of program guide data, one or more program guide tools (e.g., program guide navigation, search, and/or filter tools), one or more graphical selectors for navigating and highlighting selectable options, and/or other graphics.

Presentation facility 108 may be configured to present, within the program guide provided by program guide facility 106, information identifying one or more media content instances designated for access by one or more users selected by a main user as being of interest to the main user. The identifying information may be presented within the program guide in any suitable manner. Exemplary manners in which the identifying information may be included within the program guide will be described below.

Storage facility 110 may be configured to maintain user data 112 generated by or otherwise associated with user management facility 102 and program guide data generated by or otherwise associated with program guide facility 106 and/or presentation facility 108. Storage facility 110 may maintain additional or alternative data as may serve a particular implementation.

Figure 2:
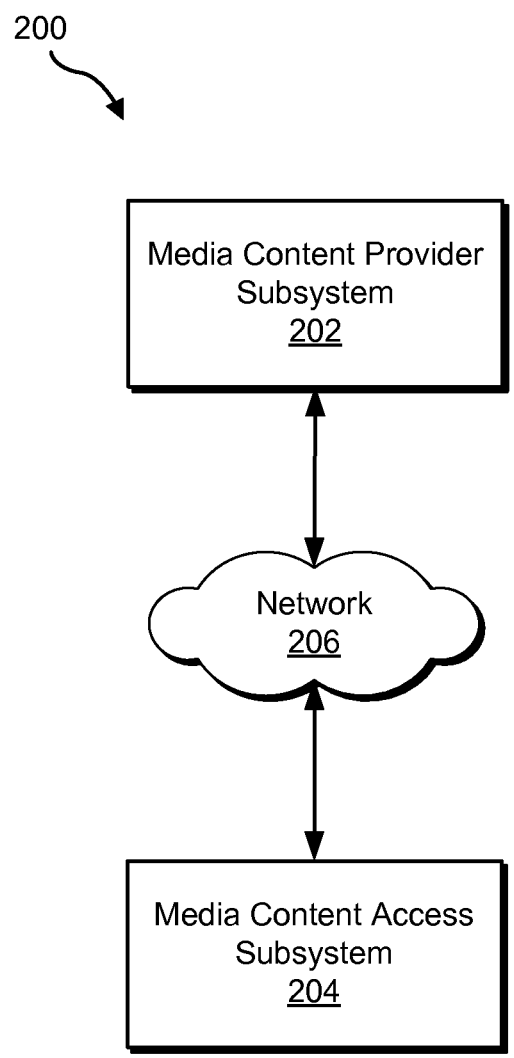
FIG. 2 illustrates an exemplary implementation of the system of FIG. 1 according to principles described herein.

FIG. 2 illustrates an exemplary implementation 200 of system 100 in which a media content provider subsystem 202 (or simply "provider subsystem 202") is communicatively coupled to a media content access subsystem 204 (or simply "access subsystem 204"). Any of the facilities 102-110 may be implemented on one or both of provider subsystem 202 and access subsystem 204.

Provider subsystem 202 may be configured to generate or otherwise provide media content and/or data associated with media content (e.g., program guide data, etc.) to access subsystem 204. For example, provider subsystem 202 may be implemented by one or more components (e.g., servers, computing devices, etc.) associated with a service provider that provides media content to one or more subscribers.

Access subsystem 204 may be configured to facilitate access by a user to the media content and/or data associated with media content received from provider subsystem 202. To this end, access subsystem 204 may present the media content for experiencing (e.g., viewing) by a user, record the media content, and/or perform any other operation associated with the media content as may serve a particular implementation.

Provider subsystem 102 and access subsystem 204 may communicate using any suitable communication technologies, devices, networks, media, and protocols supportive of remote data communications. For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network (e.g., a Verizon® FIOS® network), the Internet, an intranet, a local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

Figure 3:
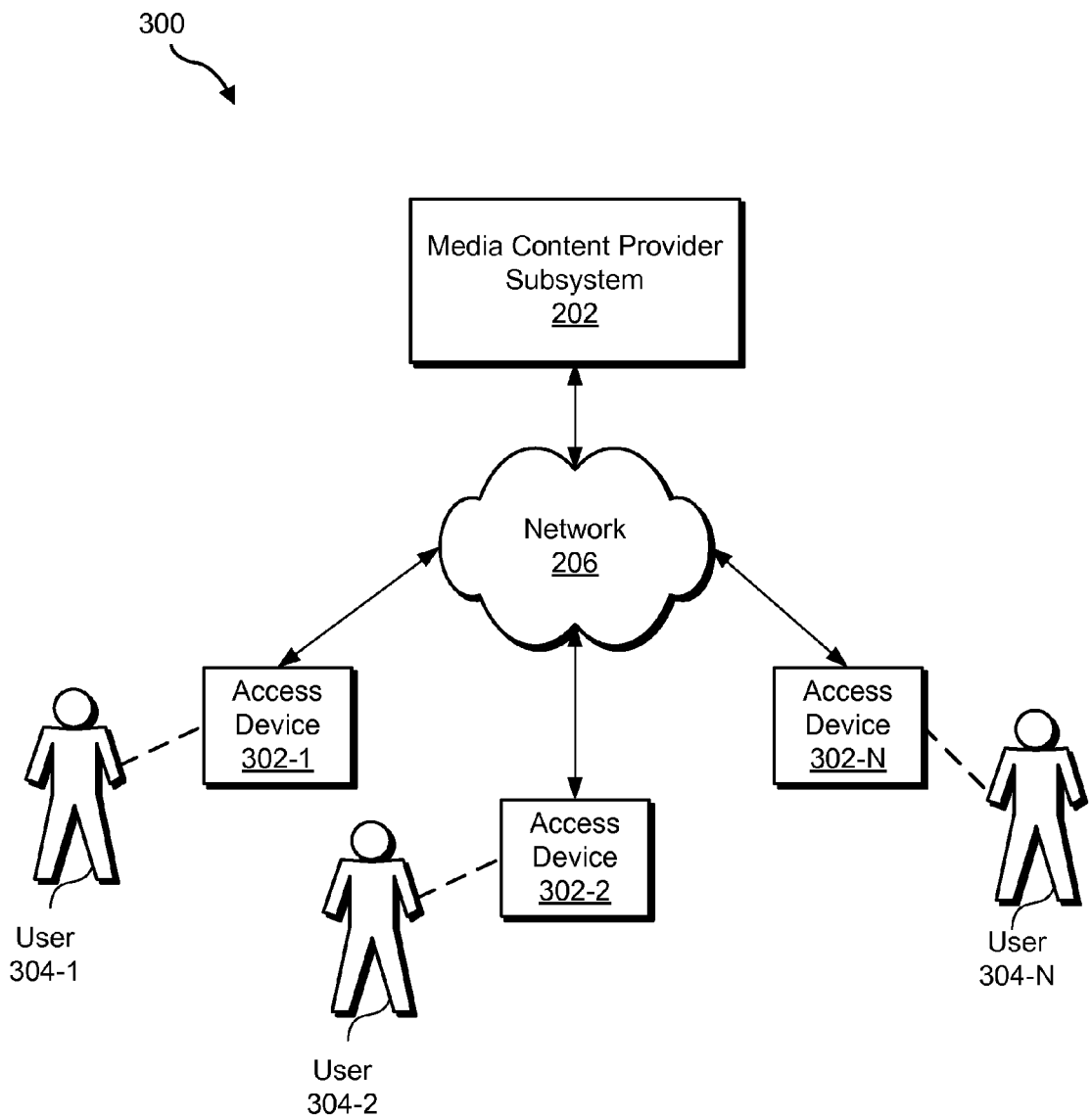
FIG. 3 illustrates another exemplary implementation of the system of FIG. 1 according to principles described herein.

Access subsystem 204 may be implemented in any suitable manner. For example, FIG. 3 shows an exemplary implementation 300 of system 100 wherein multiple media content access devices 302 (e.g., media content access devices 302-1 through 302-N) are configured to communicate with provider subsystem 202 by way of network 206. Each media content access device 302 may include, but is not limited to, a set-top box device, a media content processing device, a communications device, a media content player device, a mobile device (e.g., a mobile phone device), a handheld device, a personal computer, a phone device (e.g., Verizon Hub device), a personal-digital assistant device, a gaming device, a DVR device (e.g., a personal video recording PVR device), a television device, and/or any device configured to perform one or more of the processes and/or operations described herein. In some examples, each media content access device is associated with (e.g., is communicatively coupled to and/or includes) a display screen (e.g., a television screen, a computer monitor, etc.).

As shown, each access device 302 may be associated with or used by a distinct user 304 (e.g., users 304-1 through 304-N). In some examples, one of users 304 (e.g., user 304-1) includes a main user while one or more of the other users 304 (e.g., users 304-2 and 304-N) may be selected by the main user as being of interest to the main user.

Various ways in which system 100 may present information identifying one or more media content instances designated for access by one or more users within a program guide will now be described. It will be recognized that the ways described herein are merely illustrative of the many different ways in which the identifying information may be included in a program guide.

In some examples, the program guide may include a two-dimensional ("2D") program guide having a matrix of cells arranged relative to a navigable user axis and a time axis. The navigable user axis may be representative of a plurality of users selected by a main user as being of interest to the main user and the time axis may be representative of a plurality of time slots. Each cell within the matrix of cells may present information identifying a particular media content instance designated for access by one or more of the selected users during one or more of the time slots represented by the time axis.

Figure 4:
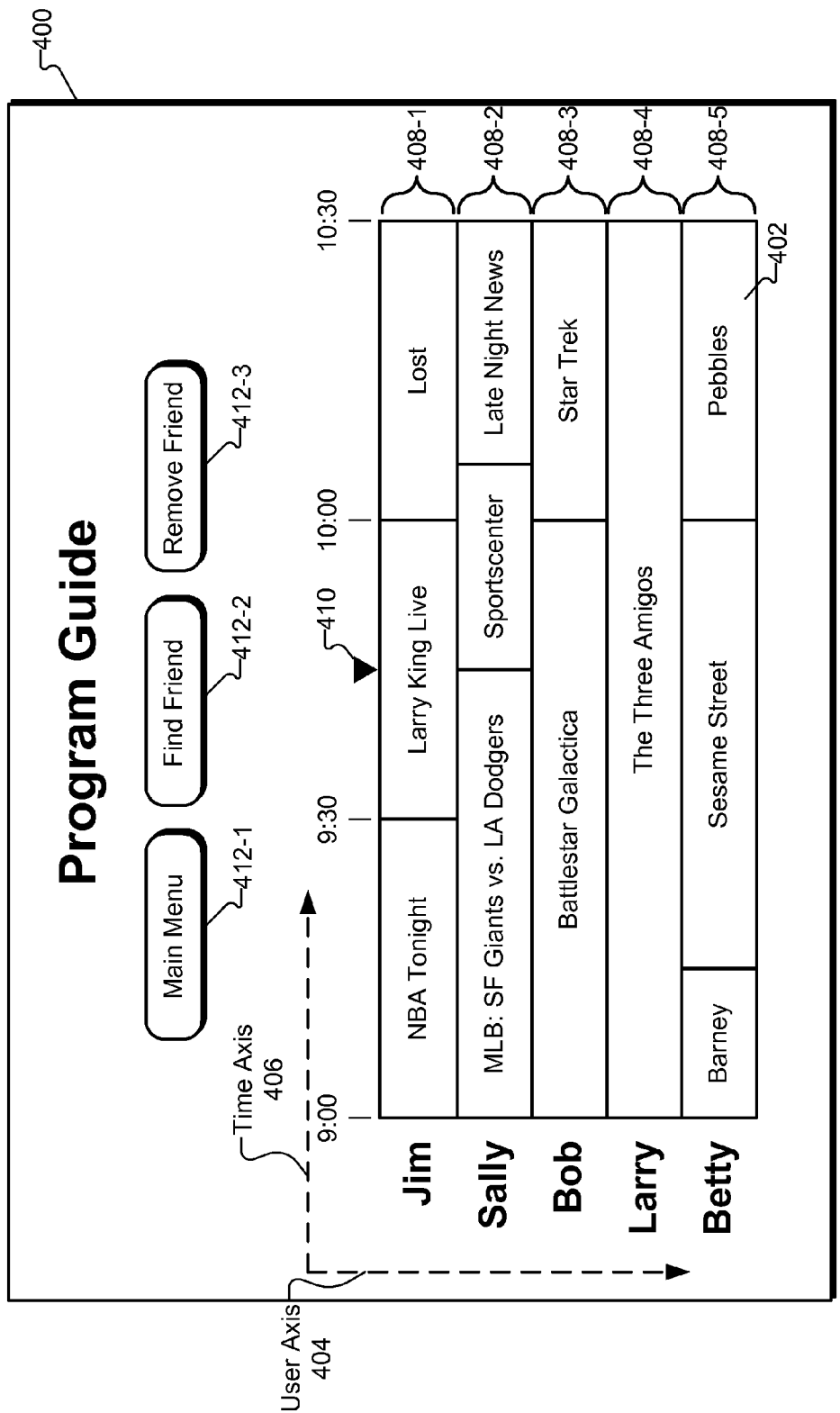
FIGS. 4-9 illustrate various graphical user interfaces that may be presented in accordance with the methods and systems described herein.

To illustrate, FIG. 4 shows an exemplary program guide view 400 of a program guide that may be displayed within a display screen associated with a media content access device. As shown, the program guide may include a matrix of cells (e.g., cell 402) arranged relative to a navigable user axis 404 and a time axis 406. Axes 404 and 406 are illustrated by dashed lines in FIG. 4 to indicate that they may not actually be displayed within program guide view 400.

In some examples, navigable user axis 404 may include a plurality of positions each corresponding to a particular user included in the plurality of users selected as being of interest to the main user. Each position may be labeled within the program guide with information (e.g., a name) identifying its corresponding user. For example, program guide view 400 shows that navigable user axis 404 may include five positions corresponding to users named "Jim," "Sally," "Bob," "Larry," and "Betty," respectively. As will be illustrated below, a user may navigate along navigable user axis 404 to selectively display cells associated with additional or alternative users within program guide view 400.

Each position along navigable user axis 404 may also correspond to a particular set of one or more cells (e.g., a row of one or more cells) within the matrix of cells. Each set of one or more cells may identify one or more media content instances designated for access by one of the users during the time slots represented by time axis 406.

To illustrate, FIG. 4 shows that a first row 408-1 includes cells identifying media content instances designated for access by the user named "Jim" during various time slots in between 9:00 and 10:30. For example, row 408-1 shows that the user named "Jim" has designated a media content instance entitled "NBA Tonight" for access between 9:00 and 9:30, a media content instance entitled "Larry King Live" for access between 9:30 and 10:00, and a media content instance entitled "Lost" for access between 10:00 and 10:30. In a similar manner, rows 408-2 through 408-5 include cells identifying media content instances designated for access by the users named "Sally," "Bob," "Larry," and "Betty," respectively, between 9:00 and 10:30.

The main user may access program guide view 400 to readily determine what Jim, Sally, Bob, Larry, and Betty are currently accessing (e.g., watching and/or recording). To illustrate, program guide view 400 may include a current time indicator 410 configured to graphically indicate a current time. In the example of FIG. 4, current time indicator 410 indicates a current time of approximately 9:45. Hence, the main user may readily determine that Jim is currently accessing "Larry King Live," Sally is about to start accessing "Sportscenter," Bob is currently accessing "Battlestar Galactica," Larry is currently accessing "The Three Amigos," and Betty is currently accessing "Sesame Street." The main user may also readily determine which media content instance(s) each of the users accessed prior to the current time indicated by current time indicator 410 and which media content instance(s) they are scheduled to access subsequent to the current time indicated by current time indicator 410.

In some examples, the main user may desire to access additional information or content associated with a particular media content instance included in the program guide. To this end, the user may provide a user input command to select a cell corresponding to the particular media content instance. System 100 may receive the user input command and, in response, present additional content associated with the selected media content instance within a separate GUI and/or within program guide view 400.

Figure 5:
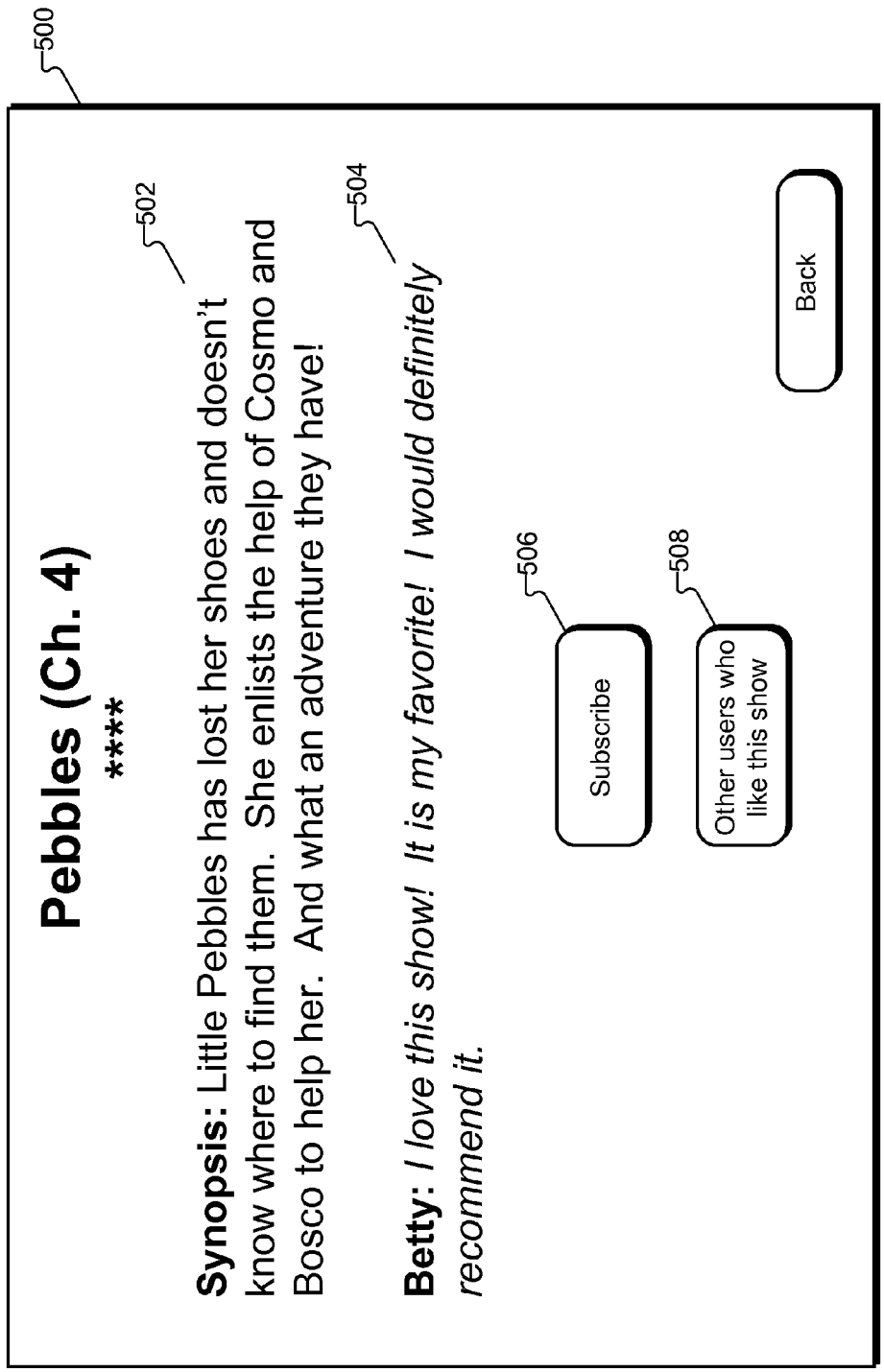

To illustrate, FIG. 5 shows an exemplary GUI 500 that may be presented in response to a selection by the main user of cell 402, which, as shown in FIG. 4, corresponds to a media content instance entitled "Pebbles." As shown in FIG. 5, GUI 500 may include various types of content related to "Pebbles." For example, GUI 500 may include a synopsis 502 of the media content instance, a review or recommendation 504 of the media content instance provided by the user named "Betty," an option 506 to subscribe to the media content instance (e.g., record one or more episodes of the media content instance), and an option 508 to identify other users who like the media content instance. Additional or alternative content may be presented within GUI 500 as may serve a particular implementation.

Returning to FIG. 4, one or more options 412 (e.g., options 412-1 through 412-3) may additionally be presented within program guide view 400. For example, the main user may select option 412-2 to find and/or identify one or more friends or other users of interest. The main user may alternatively select option 412-3 to remove one or more users from the group of selected users of interest.

In some examples, the names listed along the user axis 404 may be selected to access additional information and/or options associated with their corresponding users. For example, the name "Jim" may be selected to access information describing one or more preferences of the user named "Jim," one or more recommendations provided by the user named "Jim," and/or social networking content associated with the user named "Jim." Additionally or alternatively, an option may be presented to the user to subscribe to the same media content instances that the user named "Jim" has designated for access.

Figure 6:
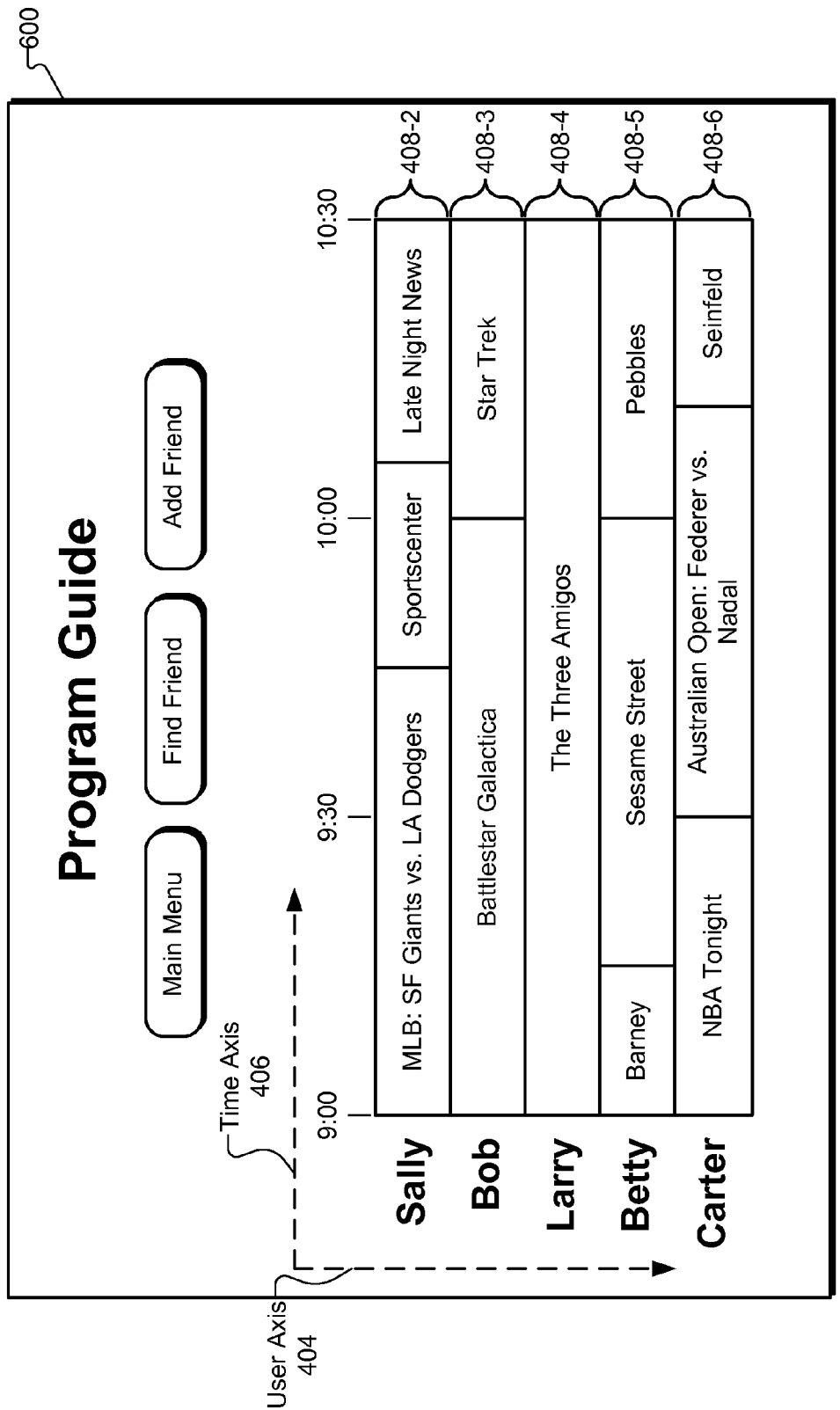

In some examples, a user may navigate along either one of axes 404 and 406 to access additional information included in the program guide. For example, a user may provide an input command to navigate (e.g., scroll) down user axis 404 in order to view information identifying one or more media content instances designated for access by one or more additional users. To illustrate, FIG. 6 shows another program guide view 600 of the 2D program guide after the user has navigated one position down user axis 404. As shown, rows 408-2 through 408-5 have shifted up one position along user axis 404 and a new row 408-6 corresponding to a user named "Carter" is now included in program guide view 600. The user may navigate along user axis 404 in a similar manner to access information corresponding to one or more other additional users.

Figure 7:
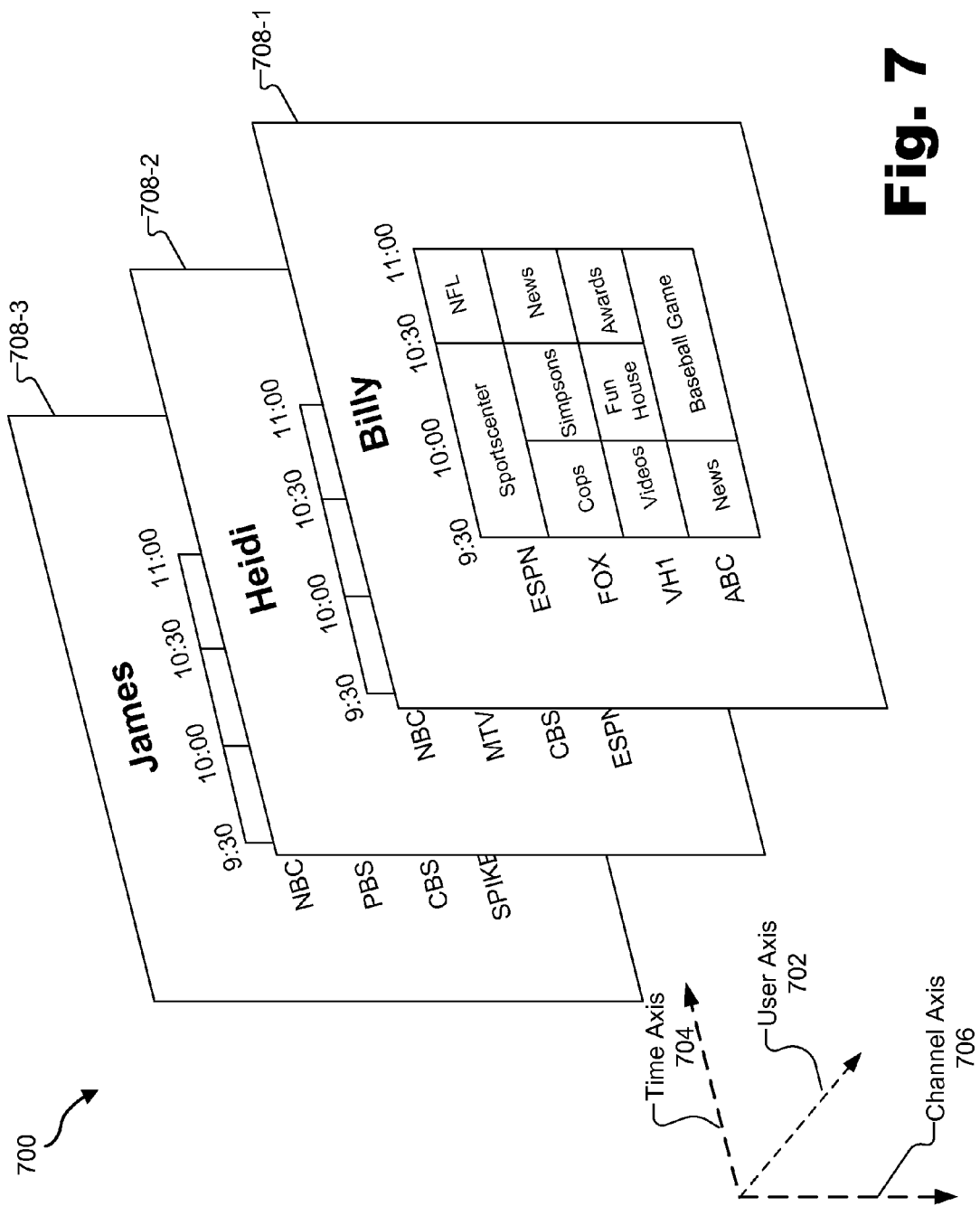

In some alternative examples, the program guide may include a three-dimensional ("3D") program guide that includes a navigable user axis representative of a plurality of users, a time axis representative of a plurality of time slots, and a channel axis representative of a plurality of channels. To illustrate, FIG. 7 shows an exemplary program guide view 700 of a 3D program guide that may be displayed within a display screen associated with a media content access device. As shown, the 3D program guide includes a navigable user axis 702, a time axis 704, and a channel axis 706. The navigable user axis 702 is perpendicular to a plane defined by the time axis 704 and the channel axis 706.

As shown, the 3D program guide may include a plurality of user-specific program guides 708 (e.g., program guides 708-1 through 708-3) each including information that identifies various media content instances designated for access by a specific user. For example, program guide 708-1 shows information identifying media content instances designated for access by a user named "Billy," program guide 708-2 shows information identifying media content instances designated for access by a user named "Heidi," and program guide 708-3 shows information identifying media content instances designated for access by a user named "James."

In some examples, the main user may navigate along any of axes 702, 704, and 706 to access additional information included in the 3D program guide. For example, the main user may navigate along user axis 702 to selectively bring a different user-specific program guide (e.g., user-specific program guide 708-2) to the forefront so that the main user may see which media content instances another user (e.g., "Heidi") has designated for access.

Figure 8:
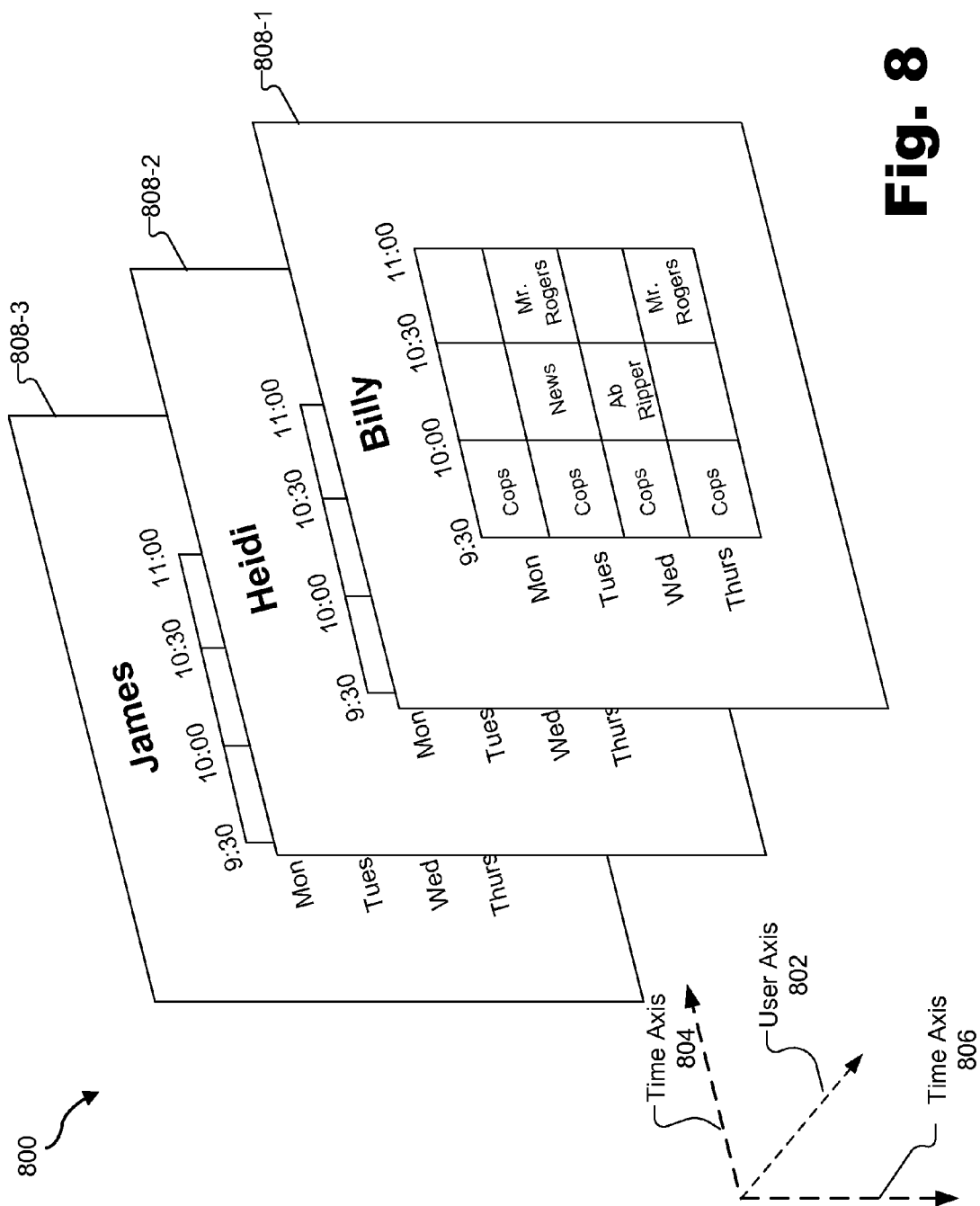

FIG. 8 shows an exemplary program guide view 800 of another 3D program guide that may be displayed within a display screen associated with a media content access device. As shown, 3D program guide view 800 includes a navigable user axis 802 and two time axes 804 and 806. The two time axes 804 and 806 may be representative of a plurality of time slots and a plurality of dates, respectively, and may form a plane to which navigable user axis 802 is perpendicular. The 3D program guide of FIG. 8 may include a plurality of user-specific program guides 808 (e.g., program guides 808-1 through 808-3) each including information that identifies various media content instances designated for access by a specific user as described above in connection with FIG. 7.

Figure 9:
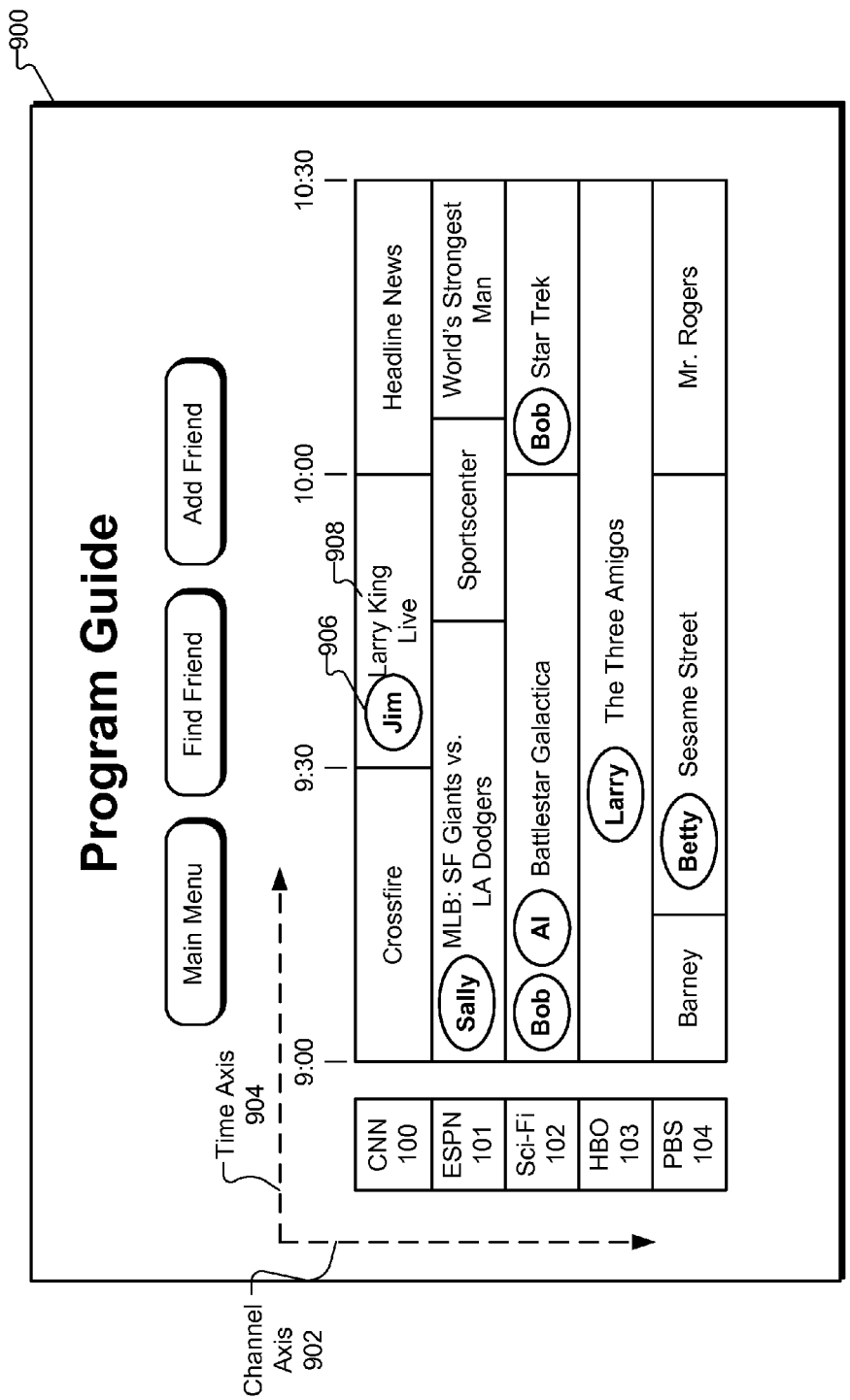

In some examples, system 100 may present information identifying one or more media content instances designated for access by one or more users within a program guide that has only a channel axis and a time axis. For example, FIG. 9 shows an exemplary program guide view 900 of a 2D program guide comprising a matrix of cells arranged relative to a channel axis 902 and a time axis 904. As shown, system 100 may present a display element (e.g., display element 906) identifying a particular user within a cell corresponding to a media content instance that has been designated for access by the particular user. To illustrate, display element 906 is displayed within cell 908 to indicate that a user named "Jim" has designated "Larry King Live" for access.

It will be recognized that the program guides described herein are merely illustrative and that other user-based program guides may be implemented in accordance with the methods and systems described herein. For example, some types of user-based program guides may not include any type of time axis. Rather, they may include lists of media content instances designated for access by one or more users arranged in any other suitable manner.

Figure 10:
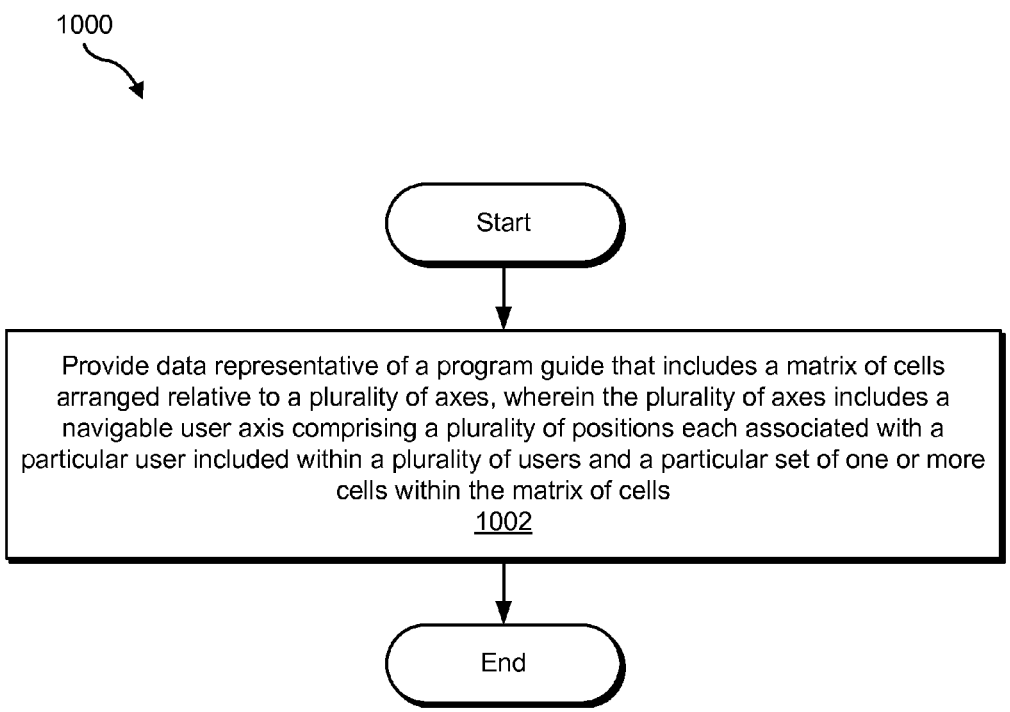
FIGS. 10-12 illustrate exemplary user-based program guide methods according to principles described herein.

FIG. 10 illustrates an exemplary user-based program guide method 1000. While FIG. 10 illustrates exemplary steps according to one embodiment, other embodiments may omit, add to, reorder, and/or modify any of the steps shown in FIG. 10. The steps shown in FIG. 10 may be performed by any component or combination of components of system 100, media content provider subsystem 202, media content access subsystem 204, and/or access devices 302.

In step 1002, data representative of a program guide that includes a matrix of cells arranged relative to a plurality of axes may be provided. The plurality of axes includes a navigable user axis comprising a plurality of positions each associated with a particular user included within a plurality of users and a particular set of one or more cells within the matrix of cells. The plurality of axes may additionally include one or more time axes and channel axes as described herein. Step 1002 may be performed in any of the ways described herein.

Figure 11:
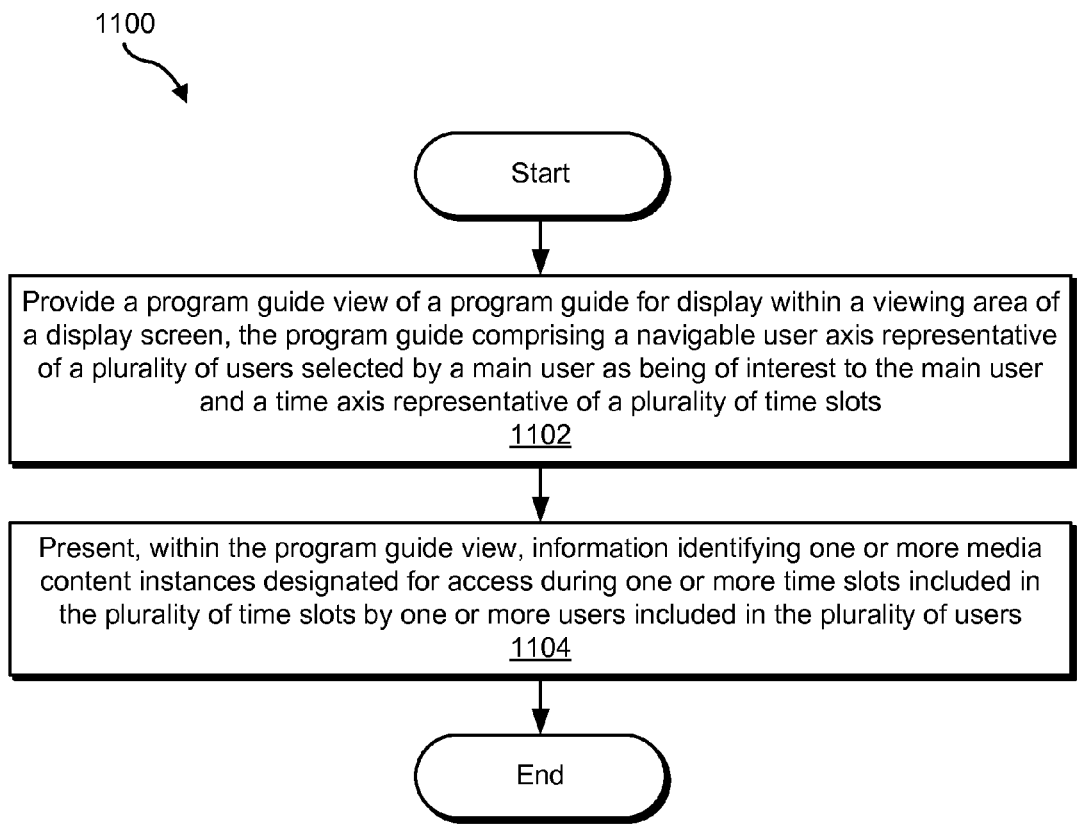

FIG. 11 illustrates another exemplary user-based program guide method 1100. While FIG. 11 illustrates exemplary steps according to one embodiment, other embodiments may omit, add to, reorder, and/or modify any of the steps shown in FIG. 11. The steps shown in FIG. 11 may be performed by any component or combination of components of system 100, media content provider subsystem 202, media content access subsystem 204, and/or access devices 302.

In step 1102, a program guide view of a program guide is provided for display within a viewing area of a display screen. The program guide includes a navigable user axis representative of a plurality of users selected by a main user as being of interest to the main user and a time axis representative of a plurality of time slots. Step 1102 may be performed in any of the ways described herein.

In step 1104, information identifying one or more media content instances designated for access during one or more time slots included in the plurality of time slots by one or more users included in the plurality of users is presented within the program guide view. Step 1104 may be performed in any of the ways described herein.

Figure 12:
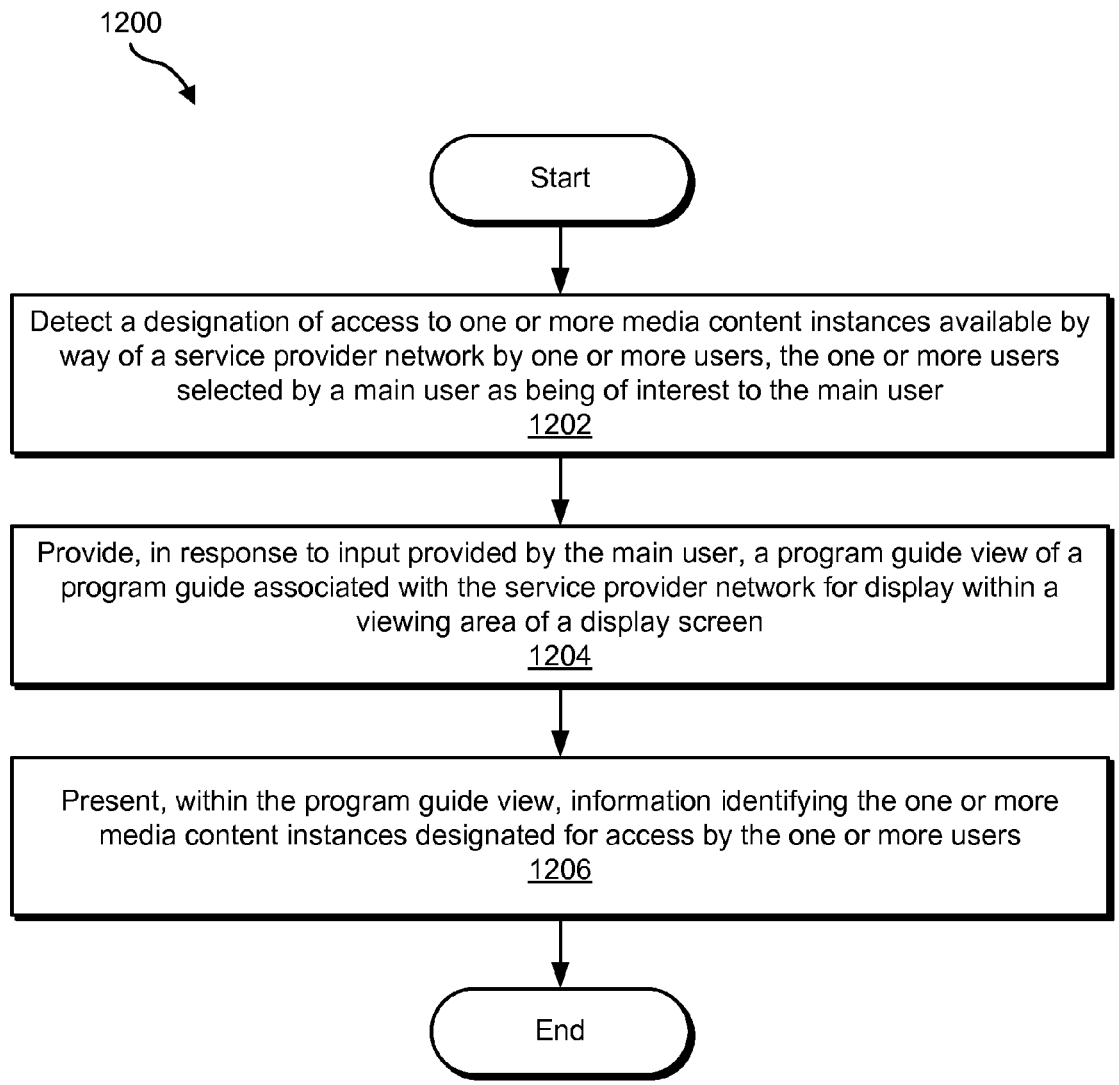

FIG. 12 illustrates another exemplary user-based program guide method 1200. While FIG. 12 illustrates exemplary steps according to one embodiment, other embodiments may omit, add to, reorder, and/or modify any of the steps shown in FIG. 12. The steps shown in FIG. 12 may be performed by any component or combination of components of system 100, media content provider subsystem 202, media content access subsystem 204, and/or access devices 302.

In step 1202, a designation of access to one or more media content instances available by way of a service provider network by one or more users is detected. As described above, the one or more users may have been selected by a main user as being of interest to the main user. Step 1202 may be performed in any of the ways described herein.

In step 1204, a program guide view of a program guide associated with the service provider network is provided for display within a viewing area of a display screen in response to input provided by the main user. Step 1204 may be performed in any of the ways described herein.

In step 1206, information identifying the one or more media content instances designated for access by the one or more users is presented within the program guide view. Step 1206 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 13:
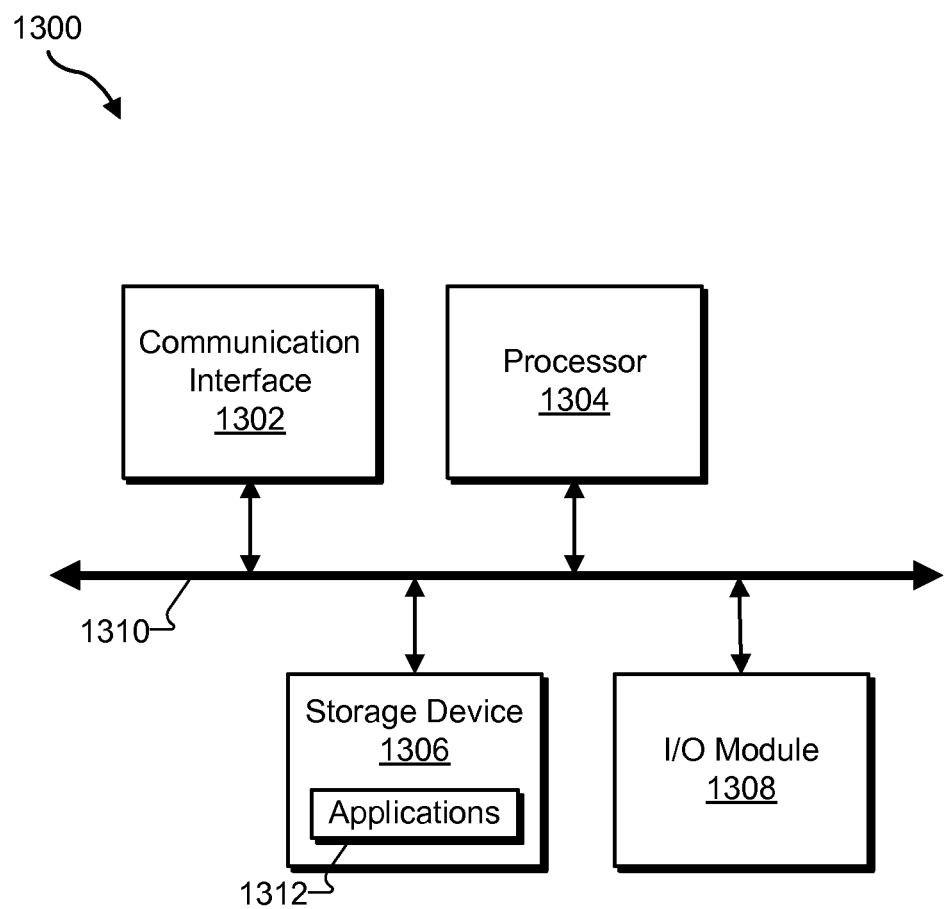
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with user management facility 102, detection facility 104, program guide facility 106, and/or presentation facility 108. Likewise, storage facility 110 may be implemented by or within storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

providing, by a media content delivery system, a program guide view of a program guide for display within a viewing area of a display screen associated with a main user, the program guide comprising a navigable user axis representative of a plurality of other users selected by the main user as being of interest to the main user and a time axis representative of a plurality of time slots, the navigable user axis comprising a plurality of positions each corresponding to a particular user included in the plurality of other users; and presenting, by the media content delivery system within the program guide view, information identifying one or more media content instances designated, by one or more users included in the plurality of other users, for access during one or more time slots included in the plurality of time slots, wherein the one or more media content instances designated for access during the one or more time slots comprise at least one of a media content instance accessed by the one or more users prior to a current time associated with the display of the program guide view, a media content instance being currently accessed at the current time by the one or more users, and a media content instance scheduled for access subsequent to the current time by the one or more users.

2. The method of claim 1, further comprising updating, by the media content delivery system in response to a user input command provided by the main user to navigate along the user axis, at least a portion of the information presented within the program guide view with additional information identifying one or more media content instances designated, by the one or more users included in the plurality of other users, for access during the one or more time slots.

3. The method of claim 1, wherein:

the program guide further comprises a matrix of cells arranged relative to the user axis and the time axis;

the navigable user axis further comprises a particular set of one or more cells within the matrix of cells; and the presenting comprises presenting the information identifying the one or more media content instances designated for axis by the particular user within the particular set of one or more cells.

4. The method of claim 1, wherein:

the program guide further comprises a channel axis representative of one or more channels; and the user axis is perpendicular to a plane defined by the time axis and the channel axis.

5. The method of claim 1, wherein:

the program guide further comprises an additional time axis representative of a plurality of dates; and the user axis is perpendicular to a plane defined by the time axis and the additional time axis.

6. The method of claim 1, wherein the program guide comprises a matrix of cells each associated with one of the one or more media content instances, and wherein the method further comprises:

receiving, by the media content delivery system, a user input command provided by the main user to select a cell included in the matrix of cells and corresponding to a particular media content instance included in the one or more media content instances; and presenting, by the media content delivery system in response to the user input command, additional content associated with the particular media content instance.

7. The method of claim 1, further comprising presenting, by the media content delivery system, an option to subscribe to the one or more of the media content instances designated, by the one or more users included in the plurality of other users, for access.

8. The method of claim 1, further comprising presenting, by the media content delivery system within the program guide view, one or more media content recommendations provided by the one or more users included in the plurality of other users.

9. The method of claim 1, embodied as computer-executable instructions on at least one non-transitory computer-readable medium.

10. The method of claim 1, further comprising:

presenting, by the media content delivery system within the program guide view, a user management graphical user interface including a selectable option configured to allow the main user to find and select one or more users for inclusion in the plurality of other users selected by the main user as being of interest to the main user.

11. The method of claim 10, wherein the user management graphical user interface further includes a selectable option configured to allow the main user to remove one or more of the users included in the plurality of other users selected by the main user from the plurality of other users.

12. A method comprising:

detecting, by a media content delivery system, a designation, by one or more users, of access to one or more media content instances available by way of a service provider network, the one or more users being different than a main user and selected by the main user as being of interest to the main user;

providing, by the media content delivery system in response to input provided by the main user, a program guide view of a program guide associated with the service provider network for display within a viewing area of a display screen; and presenting, by the media content delivery system within the program guide view, information identifying the one or more media content instances designated, by the one or more users, for access, wherein the one or more media content instances designated, by the one or more users, for access comprise at least one of a media content instance accessed by the one or more users prior to a current time associated with the display of the program guide view, a media content instance being currently accessed at the current time by the one or more users, and a media content instance scheduled for access subsequent to the current time by the one or more users.

13. The method of claim 12, wherein the program guide further comprises a matrix of cells arranged relative to a navigable user axis representative of the one or more users and a time axis representative of a plurality of time slots, the navigable user axis comprising a plurality of positions each corresponding to a particular user included in the one or more users and a particular set of one or more cells within the matrix of cells.

14. The method of claim 12, wherein:

the program guide further comprises a matrix of cells arranged relative to a channel axis representative of a plurality of channels and a time axis representative of a plurality of time slots; and the presenting comprises presenting a display element identifying a user included in the one or more users within a cell corresponding to a media content instance that the user has designated for access and that is included in the one or more media content instances.

15. The method of claim 12, embodied as computer-executable instructions on at least one non-transitory computer-readable medium.

16. A system comprising:
a program guide facility configured to provide a program guide view of a program guide for display within a viewing area of a display screen associated with a main user, the program guide comprising a navigable user axis representative of a plurality of other users selected by the main user as being of interest to the main user and a time axis representative of a plurality of time slots; and
a presentation facility communicatively coupled to the program guide facility and configured to present information within the program guide view, the information identifying one or more media content instances designated, by one or more users included in the plurality of other users, for access during one or more time slots included in the plurality of time slots,
wherein
the navigable user axis comprises a plurality of positions each corresponding to a particular user included in the plurality of other users, and
the one or more media content instances designated for access during the one or more time slots comprise at least one of a media content instance accessed by the one or more users prior to a current time associated with the display of the program guide view, a media content instance being currently accessed at the current time by the one or more users, and a media content instance scheduled for access subsequent to the current time by the one or more users.

17. A system comprising:
a detection facility configured to detect a designation, by one or more users, of access to one or more media content instances available by way of a service provider network, the one or more users being different than a main user and selected by the main user as being of interest to the main user;
a program guide facility communicatively coupled to the program guide facility and configured to provide, in response to input provided by the main user, a program guide view of a program guide associated with the service provider network for display within a viewing area of a display screen; and
a presentation facility communicatively coupled to the program guide facility and configured to present information within the program guide view, the information identifying the one or more media content instances designated, by the one or more users, for access, the one or more media content instances designated, by the one or more users, for accesses comprising at least one of a media content instance accessed by the one or more users prior to a current time associated with the display of the program guide view, a media content instance being currently accessed at the current time by the one or more users, and a media content instance scheduled for access subsequent to the current time by the one or more users.

* * * * *